Figure 1:
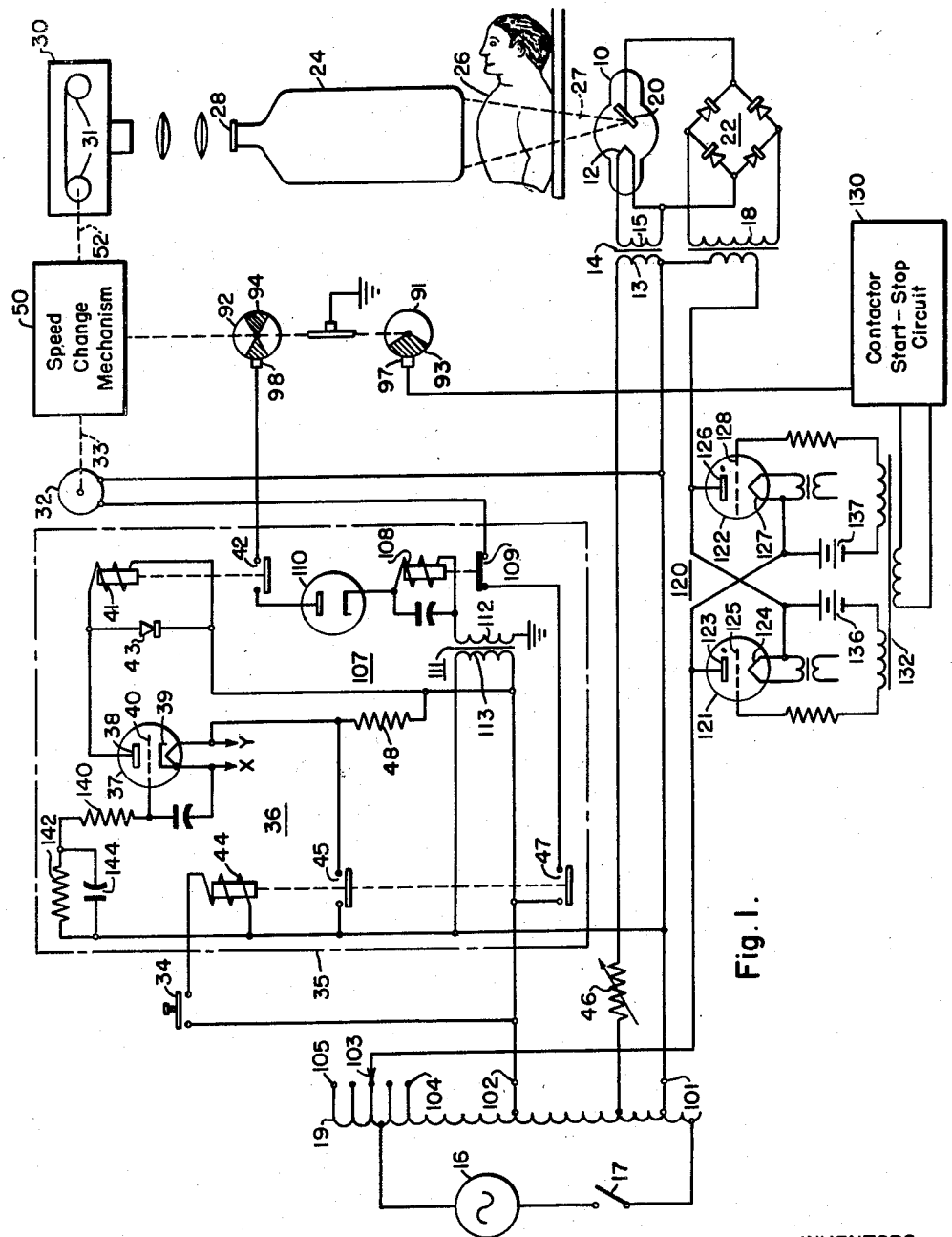

May 17, 1960     F. J. EULER, JR., ET AL     2,937,277
X-RAY APPARATUS

Filed Nov. 7, 1956     2 Sheets-Sheet 1

WITNESSES:

INVENTORS
Fred J. Euler, Jr. and
Stanley C. Lane.
BY
ATTORNEY

May 17, 1960  F. J. EULER, JR., ET AL  2,937,277
X-RAY APPARATUS

Filed Nov. 7, 1956  2 Sheets-Sheet 2

United States Patent Office

2,937,277
Patented May 17, 1960

2,937,277

X-RAY APPARATUS

Fred J. Euler and Stanley C. Lane, Baltimore, Md., assignors to Westinghouse Electric Corporation, East Pittsburgh, Pa., a corporation of Pennsylvania Application November 7, 1956, Serial No. 620,963

13 Claims. (Cl. 250—65)

This invention relates to X-ray apparatus and more particularly to apparatus for use in cinefluorography embodying a motion picture camera and an electronic intensifier of the type described in Mason et al. Patent 2,523,132, issued September 9, 1950, and further including an electronic contactor of the type described in United States Patent 2,785,343, of R. L. Wright et al., issued March 12, 1957, for X-Ray Apparatus, and assigned to the assignee of the present invention.

In X-ray apparatus arranged for fluoroscopic examination of the lung field, the heart, and the gastro-intestinal system it is frequently desirable to provide a photographic record of the conditions observed by the fluoroscopist. While some types of apparatus have been devised whereby radiographic plates may be inserted into the fluoroscopic field of vision to provide occasional photographic records, there has been no successful apparatus built to our knowledge which will permit motion picture photography of the image observed by the fluoroscopist.

In medical studies of the gastro-intestinal tract there has been an increasing need for means to make moving pictures of the travel of opaque material through the esophagus, the stomach, and the small intestine. Because of the peristaltic motion of the stomach and intestines it is often possible to observe certain featuers of interest only for short time intervals. A need, therefore, has existed for apparatus to make motion picture photographs as an adjunct to visual observation.

The production of X-ray motion pictures has been attempted in the past by methods in which full size X-ray sensitive film is exposed directly to X-radiation passing through the patient. That technique has been generally unsatisfactory because it requires X-ray generating apparatus of excessively high power ratings and more important, it necessitates the exposure of the patient to such large quantities of deleterious radiation that a motion sequence of only a few seconds may seriously jeopardize the health of the patient. The image intensifier described in Mason et al. Patent 2,523,132 is operative to intercept an X-ray beam and to produce a visible image corresponding to the X-ray beam and several orders of magnitude brighter than the image of prior art fluorescent screens. Our present invention comprises apparatus for enabling that image intensifier to be used in combination with a motion picture camera and conventional X-ray generator apparatus for making motion pictures of the visible fluorescent image at either one of two predetermined repetition rates or film speeds. In one embodiment the apparatus of our invention is operative to make motion picture recordings at either 30 frames per second or alternatively at 15 frames per second. The normal speed of operation is at 15 frames per second. Motion picture film so made may be projected at the standard projector speed of 16 frames per second. By taking motion pictures at 30 frames per second with our apparatus and then projecting them at the standard speed of 16 frames per second the effect of slow motion is obtained.

Accordingly one object of our invention is to provide a new and improved apparatus for cinefluorography.

It is another object of the invention to provide an arrangement by which X-ray motion picture photography may be carried out at either of two preselectable film frame rates as desired by the operator.

It is a further object of the invention to provide apparatus for motion picture photography of a fluorescent X-ray image in which the film transport mechanism of a motion picture camera is operated in synchronism with pulses of radiation from an intermittently energized X-ray generator, the energization of which is cyclically controlled by an electronic contactor.

It is an additional object of this invention to provide a cinefluorographic apparatus in which a motion picture film drive mechanism is accurately synchronized with an X-ray generator so that X-rays will be produced only in time periods during which the motion picture film is stationary.

It is a different object of this invention to provide a cinefluorographic apparatus including a film transport mechanism and an intermittently energized X-ray generator in which the film transport mechanism is adapted to be operated at either of two predetermined speeds and in which the X-ray generator is adapted to be energized in synchronism with the film transport mechanism and also in a predetermined phase relationship relative to an alternating current voltage source.

It is still another object of this invention to provide a motion picture film propulsion device for cinefluorographic apparatus whereby the film may be driven at a selected one of a plurality of film frame rates and whereby a different rate may be selected without disturbing the mechanical synchronization of the film transport means and the driving motor of the film projection system.

It is a still further object of this invention to provide apparatus for intermittent energization of an X-ray generator utilizing an electronic contactor controlled by a motion picture camera drive mechanism which includes a synchronous driving motor and which is adapted to drive said camera and to energize said contactor at any one of the pluralities of preselectable rates, but at all times in a predetermined phase relation to an alternating current voltage source.

It is an even still further object of the invention to provide an X-ray apparatus which utilizes an electronic contactor controlled by a motion picture film transport mechanism incorporating means to insure closing of the electronic contactor during a half period of the alternating current supply voltage and at the beginning of a cyclical period when the motion picture film is positioned for exposure.

Figure 2:
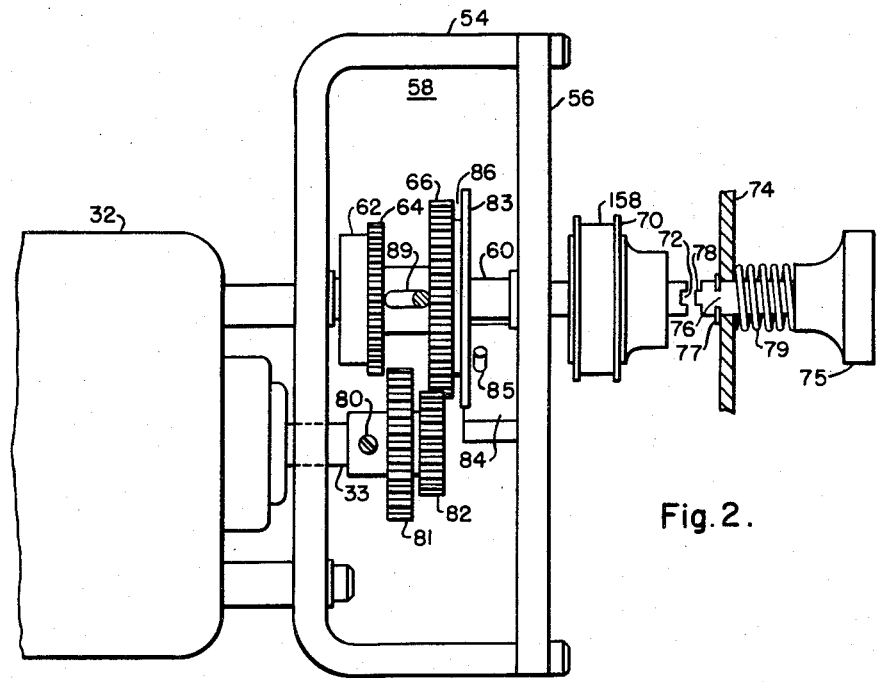
Figure 3:
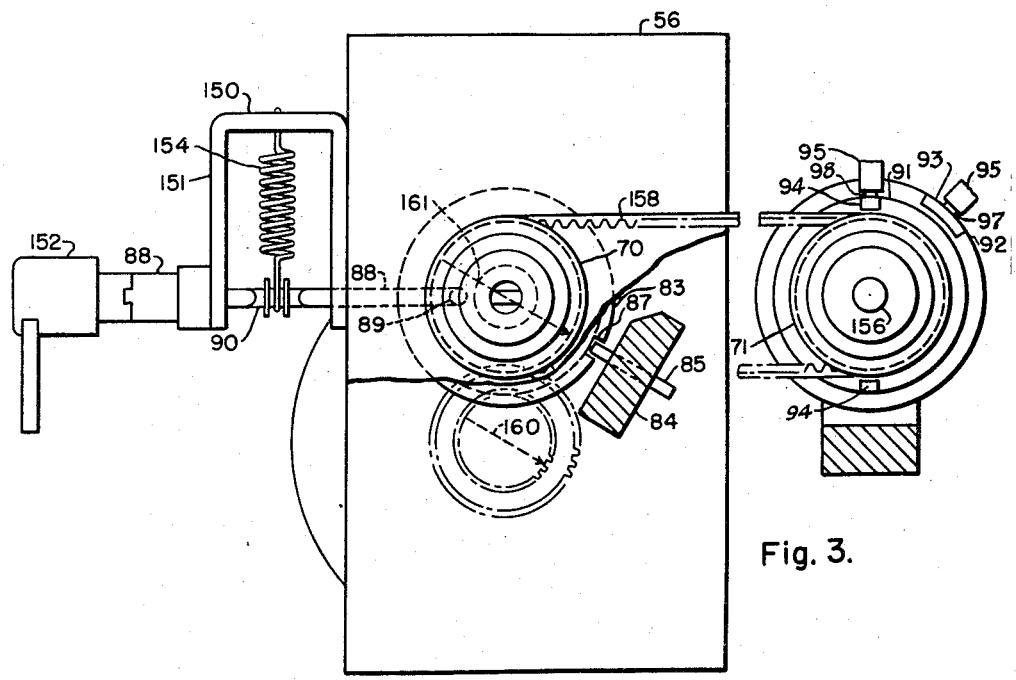

These and other objects and advantages of our invention will be apparent from the following description taken in accordance with the accompanying drawings, throughout which like reference characters indicate like parts, and in which:

Figure 1 is a schematic diagram of the apparatus in accordance with the present invention showing the operative relationships between the various circuits for energizing and controlling the X-ray generator and the motion picture camera, Figure 2 is a view partly in section and partly in elevation of a change-speed mechanism for driving the film transport mechanism and including a synchronous motor prime mover, and Figure 3 is an end view partly in section, of the change-speed mechanism of Figure 2.

In Figure 1 there is shown an X-ray tube 10 having a filament 12 which is supplied with filament heating energy by a filament supply transformer 14 having a primary winding 13 connected to a suitable alternating current source through a filament excitation control rheostat 46. A conventional high tension transformer 18 is connected to the filament 12 and the anode 20 of the X-ray tube 10 through a conventional bridge rectifier circuit 22. An image intensifier device 24 is positioned relative to a patient or object 26 to be subjected to an image forming beam 27 of X-radiation from the X-ray tube 10. The image intensifier 24 is operative to produce a brightened and minified image on its fluorescent screen 28. A motion picture camera 30 is positioned relative to the fluorescent screen member 28 so that the visible fluorescent image on the screen member 28 is operative to create a latent image on the film within the camera 30. A camera driving motor 32 is mechanically connected to the camera 30 through a speed-change mechanism 50 with the speed-change mechanism 50 being also operative to drive a plurality of commutator type periodic switches 91 and 92. The camera driving motor 32 is electrically connected to a suitable source of alternating current voltage 19 through a motor synchronizing circuit 35.

The alternating current voltage source may comprise a conventional autotransformer 19 which is connected to a commercial source of alternating current power 16 through a circuit breaker 17. The autotransformer 19 is provided with a plurality of output terminals 101, 102, 103, 104 and 105. The primary winding of the high tension transformer 18 is connected in series with an electronic contactor 120 to an adjustable tap 103 on the autotransformer 19 which may be used to select the voltage at which the X-ray tube 10 is to be operated. The electronic contactor 120 may comprise essentially a pair of inverse-parallel connected thyratron tubes 121 and 122 and may further include a contactor start-stop circuit 130 which is responsive to an electrical input signal from a first commutator switch 91 to apply an alternating current voltage to the control electrodes 125 and 128 of the first 121 and second 122 thyratron tubes through a control signal transformer 132. The electronic contactor 120 and its start-stop circuit 130 may be of the type described and shown in the aforementioned Wright et al. Patent 2,785,343.

In an electronic contactor of the type described by the above-mentioned copending application the contactor start-stop circuit 130 is so arranged that, in the presence of a signal from switch 91, it will initiate conduction of the first contactor tube 121 near the beginning of the first alternating current supply voltage half period during which the anode 123 of the first contactor tube is positive with respect to its cathode 124. If an input signal from the first commutator switch 91 is applied to the start-stop circuit 130 during a half period when the second contactor tube anode 126 is positive, the start-stop circuit 130 will not initiate conduction of the second thyratron tube 122 at that time but will wait until the applied voltage half period when the anode 123 of the first contactor thyratron 121 swings positive and will then initiate conduction of the first contactor thyratron tube 121.

Thus it is seen that energization of the high tension transformer 18 always begins during a half period when the anode 123 of the first contactor tube 121 is positive. On the next half period of the alternating current supply voltage wave the anode 123 of the first contactor tube 121 is negative so that it is rendered non-conductive; the anode 126 of the second contactor tube 122 is now positive and the second contactor tube 122 is rendered conductive by a second pulse from the start-stop circuit 130 appearing in the grid circuit of the second contactor tube to overcome the negative bias source 137 and to render the second contactor tube 122 conductive by driving the grid 128 of that tube positive. The first contactor tube 121 and the second contactor tube 122 then continue to conduct during alternate half periods of the alternating current voltage wave so long as the conductive segment 93 of the first commutator switch 91 is in contact with a brush 97 so as to ground the input to the contactor start-stop circuit 130. Thus through the electronic contactor 120 the high tension transformer 18 and the bridge rectifier 22, a full wave rectified potential is applied to the X-ray tube 10 so long as the first commutator switch 91 is closed.

From the foregoing it is seen that the X-ray tube 10 will always be first energized during a half period of the alternating current supply voltage when the adjustable tap 103 of the autotransformer 19 is positive with reference to the common terminal 101. It is, therefore, necessary that the camera driving motor 32 be locked in synchronism with the voltage supply source wave in a phase relationship such that the film in the camera 30 is positioned for exposure shortly before the adjustable tap 103 becomes positive. The first commutator type switch 91 is adjusted to make contact with the brush 97 at or shortly before the adjustable tap 103 on the autotransformer 19 swings positive with respect to the common terminal 101. After the first commutator switch 91 is adjusted, it is possible that the motor 32 could pull into synchronism on the wrong half of the alternating current voltage wave or exactly 180 electrical degrees from the desired phase relation. To avoid this possibility the motor synchronizing circuit 35 is provided to cause the motor 32 to slip a pole if the motor pulls into synchronism on the wrong phase. The camera driving motor 32 is preferably a four pole synchronous induction motor. One terminal of the motor 32 is connected directly to the common terminal 101 of the autotransformer 19. The other terminal of the motor is connected through the motor synchronizing circuit to a suitable intermediate tap 102 on the autotransformer.

The motor synchronizing circuit 35 is comprised of two cooperative circuits, one of which is a time delay circuit 36 comprising a grid control electron discharge device 37 having an anode 38, cathode 39 and a control electrode 40. The anode 38 is connected through the coil of a relay 41 and through a selenium rectifier 43 to one terminal 102 of the alternating current voltage source 19. The cathode 39 is connected through the filament and through the contacts 45 of a second relay 44 to the common terminal 101 of the A.C. voltage source 19. The cathode 39 is further connected through the filament and through a dropping resistor 48 to the first terminal 102 of the voltage source. The grid or control electrode 40 is connected to the common terminal 101 of the voltage source 19 through a resistor 140 and through a capacitor 144, which capacitor is shunted by the resistor 142 to form a leakage path through which the capacitor 144 may lose its charge at a predetermined rate. The energizing coil of the relay 44 is connected across the voltage source in series with a push button 34.

With the push button switch 34 in its open position as illustrated, the second relay 44 is deenergized so that the relay contacts 45 and 47 are open in which case no current flows in the anode-cathode circuit of the discharge device 37 and the relay 41 is not energized. With the push button switch 34 open, there will be a grid current flowing during each half period when the common terminal 101 is positive with respect to the intermediate terminal 102 of the voltage supply source 19. This grid current flows from the intermediate terminal 102 through the resistor 48 and through the filament to the cathode 39 and then through the electron tube 37 from the cathode to the grid 40 and through the grid resistor 140 to the adjacent plate of the timing capacitor 144. The capacitor 144 is thus charged in such a manner that the capacitor terminal which is connected to the grid 40 is negative with respect to the other capacitor terminal. Thus it is seen that with the synchronizing circuit 35 in a quiescent state, as is the case with the control push button 34 open, the discharge device 37 conducts grid current to charge the capacitor 144 to a predetermined voltage dependent upon the alternating current potential appearing between the common terminal 101 and the intermediate terminal 102 of the voltage source.

When the push button switch 34 is closed, the relay 44 is energized to close the first contacts 45 and the second contacts 47. Closing of the first contacts 45 applies alternating current voltage across the plate-cathode circuit of the discharge device 37 through the coil of the relay 41, so that the discharge device 37 will be operative to pass current as soon as the negative bias voltage on the timing capacitor 144 has discharged to a sufficiently low value. Closing of the first contacts 45 also connects the cathode 39 to the common terminal 101 of the voltage source 19 so that the voltage source is no longer applied across the grid-cathode circuit of the discharge device 37. The voltage now applied to the grid 40 with respect to the cathode 39 comprises the D.C. voltage across the timing capacitor 144 plus the small alternating current voltage applied to the filament from a filament supply voltage source $xy$. Thus the discharge device grid 40 is biased with a negative voltage corresponding to the charge on the timing capacitor 144 and has a small alternating current voltage superimposed thereon. When the timing capacitor 144 has discharged to a predetermined value, the alternating current voltage applied to the anode 38 will be sufficient to overcome the grid bias and the discharge device 37 will conduct current from its cathode 39 to its anode 38 to operate the second relay 41.

During the timing period, before the discharge device 37 becomes conductive, the second contacts 47 of the relay 44 are closed. The camera motor 32 is thus energized through a circuit including the intermediate terminal 102 of the voltage source, the second contacts 47 and the normally closed contacts 109 of a third relay 108. The component values of the timing capacitor 144 and the resistor 142 are chosen to make the timing period of the time delay circuit 36 long enough for the motor to reach synchronous speed.

The second portion of the motor synchronizing circuit 35 is a motor phase testing circuit 107 which comprises a second commutator switch 92, relay contacts 42, a diode discharge device 110, a third relay 108, and the secondary winding 112 of an auxiliary transformer 111. The second commutator switch 92 is connected to periodically complete a circuit through its brush 98, the contacts 42 of the relay 41, the discharge device 110 and the coil of the third relay 108, and through the secondary 112 of the transformer 111 to ground. The primary 113 of the auxiliary transformer 111 is connected directly to the voltage supply source 19 across the common terminal 101 and the intermediate terminal 102. The voltage induced in the secondary 112 of the auxiliary transformer 111 is sufficient to energize the third relay 108, by conducting current through the diode discharge device 110 on alternate half cycles, if the second commutator switch 92 is conductive during the half cycles when the anode of the diode discharge device 110 is positive with respect to its cathode. If the second commutator switch 92 is closed during the alternate half cycles when the ground end of the secondary winding 112 is negative then the diode 110 will not conduct and the third relay 108 will not be energized. Thus it is seen that the motor phase testing circuit 107 is sensitive to determine whether the camera driving motor 32 has locked into synchronism on the proper phase of the alternating current voltage. If the motor phase is improper the commutator switch 92 will be closed while the ground end of the secondary winding 112 is positive so that the diode 110 conducts current energizing the third relay 108 and opening the contacts 109 to deenergize the motor 32. The motor will then decelerate sufficiently so that the second commutator switch 92 is no longer conductive during the half periods in which the grounded end of the secondary winding 112 is positive. The third relay 108 will be deenergized to close its contacts 109 to again supply power to the camera motor 32. Thus it is seen that if the camera motor 32 is initially synchronized in the improper phase, the synchronizing circuit 35 operates to open the voltage supply circuit of the motor 32 to cause the motor to slip a pole, at which time the motor 32 is reenergized. If the motor again locks into synchronism on the wrong phase the procedure described is automatically repeated until the motor 32 synchronizes in the desired phase relative to the alternating current voltage source 19.

From the foregoing description of the operation of Fig. 1, it is seen that the synchronous motor shaft 33 will be at a predetermined angular position at the instant when voltage is applied to the X-ray tube 10 at the beginning of a positive half-cycle of the voltage source wave. In order that the camera film will be moved in the interval between X-ray pulses and will come to rest in a temporarily fixed position shortly before voltage is applied to the X-ray tube 10, the motor shaft 33 and the film transport means 31 must be mechanically coupled so that the drive shaft 52 of the film transport means will always be at a certain angular position when the motor 32 is at the above-mentioned predetermined angular position.

Further, in order to provide two different film frame rates, a speed change mechanism 50 must be mechanically coupled between the motor 32 and the film driving sprockets 31. To retain the desired phase relation between the motor shaft 33 and the film sprockets 31 while shifting speeds, the speed-changer must engage or mesh the low speed drive before the high speed drive is entirely disengaged; that is, there must be no neutral or disengaged position of the speed-change gearing 50.

In Fig. 2 there is shown the detailed structure of the speed-change mechanism 50 which is drivingly connected between the synchronous motor 32 and the camera 30 of Fig. 1.

The speed-change mechanism 50 comprises a U-shaped frame 54 supported from the synchroous motor 32 and with a planar support member 56 closing the ends of the U-shaped frame to provide a gear enclosing space 58. The motor 32 is supported outside the frame 54 with the motor shaft 33 extending through an opening in the frame 54 to provide a driving shaft for the gear system. The driving shaft 33 is preferably aligned perpendicular to the support member 56.

A driven shaft 60 carrying a plurality of gears 64 and 66 is journalled at one end in the U-shaped frame 54 and is further journalled in a bearing in the planar support member 56. The driven shaft 60 extends through the support member 56 in substantial parallelism with the driving shaft 33 and carries an internally toothed V-belt pulley 70 near its end. The outer end of the driven shaft 60 is provided with a relatively wide slot 72 which is operative as one-half of a square-jaw clutch.

A portion of a decorative housing 74 for the speed-change and camera system is shown in Fig. 2. A stub shaft 76 projects perpendicularly through the housing portion 74, and is captively secured thereto by means of a snap-ring 77 near the inner end of the stub shaft 76 and by a knurled knob 75 secured to the outer end of the stub shaft 76. The stub shaft 76 is axially aligned with the driven shaft 60 and has a rectangular projection 78 at its inner end which is adapted to engage the square jaw 72 on the end of the driven shaft 60, so that the driven shaft may be manually rotated by inwardly pressing and rotating the knurled knob 75. A coil spring 79 is captively retained on the stub shaft 76 between the decorative housing 74 and the knob 75 and is operative to normally bias the stub shaft 76 to a disengaged position.

The driving shaft 33 has a pair of gears including a large gear 81 and a small gear 82 secured to its end as by means of a locking screw or pin 80. The large gear 81 and small gear 82 preferably comprise a large toothed portion and small toothed portion on a single hub member. Within the gear enclosing space 58 and on the driven shaft 60 is carried a spool gear 62 including a first toothed portion 64 and a second toothed portion 66 having respectively, a smaller and a larger diameter. The first and second toothed portions are axially spaced apart a distance somewhat less than the axial dimension between the outer faces of the large gear 81 and the small gear 82 on the driving shaft 33. The spool gear 62 is splined on the driven shaft 60 by means of a key and key-way (not shown) so as to be axially shiftable relative to the driven shaft 60 while being secured for rotation therewith. Attached to the outer side of the second toothed portion 66 of the spool gear 62 is an indexing plate 83 having a slot 87 at one point in its periphery. Attached to the inner side of the support plate 56 is a support block 84 which carries an indexing pin 85 in a position to engage the slot 87 in the indexing plate 83 as the spool gear 62 is shifted from the position shown in Fig. 2 toward the support plate 56. For the low speed drive of the camera mechanism 30 the spool gear 62 is positioned as shown in Fig. 2 with the indexing plate 83 being slightly spaced from the indexing pin 85 and not in engagement therewith. In the high speed drive of the film mechanism the spool gear 62 is shifted outwardly toward the support plate 56 so that the small driving gear 82 and the large driven gear 66 are disengaged and the large driving gear 81 and the first driven gear 64 are meshed. In this orientation the indexing pin 85 is located in a groove 86 between the second driven gear 66 and the indexing plate 83 so that the spool gear 62 is free to rotate without contacting the indexing pin 85.

In Fig. 3 is shown an end view of the apparatus of Fig. 2 including a showing of the shifting means 88 for moving the spool gear 62 from its first position to its second position and vice versa. The shifting means comprises a U-shaped bracket 150 which is rigidly attached to the left hand side of the frame member 54 and the support plate 56. A single tined shifting fork 88 extends through a pair of aligned openings in the support bracket 150 and has its inwardly extending end or tine 89 extending radially between the first and second tooth portions 64 and 66 of the spool gear 62. The inner end 89 of the shifting fork 88 is bent with respect to the principal portion of the shifting fork so as to provide an eccentric member 89 which will engage the inner side of either the first toothed portion 64 or the second toothed portion 66 of the spool gear 62 as the shifting fork 88 is rotated. The outer end of the shifting fork is journalled in the outer leg 151 of the U-shaped bracket 150 and carries outwardly thereof a suitable shifting handle 152 or knob.

As shown in Fig. 3, the intermediate portion of the shifting fork 88 between the legs of the U-shaped bracket 150 includes an eccentric portion 90. A tension spring member 154 is attached between the eccentric portion 90 and to the U-shaped bracket 150 so as to provide an over-center biasing detent means for the rotatable shifting fork 88. The gear shifting member of Fig. 3 operates as follows: As the shifting handle 152 is rotated upwardly from the plane of Fig. 3, the shifting tine 89 as shown in Fig. 2, is rotated counterclockise out of engagement with the first toothed portion 64 and overcenter so as to engage the second toothed portion 66. At that point, it is biased against the second tooth portion 66 by the tension spring member 154. If the spool gear 62 is then at a rotated position such that the indexing pin 85 is in alignment with the slot 87 in the indexing plate 83, the shifting tine 89 under the tension of the spring member 154 will apply sufficient pressure to the innerside of the second toothed portion 66 to force the spool gear 62 into the high speed position so that the indexing pin 85 is between the indexing plate 83 and the second toothed portion 66 of the spool gear 62.

Further shown in Fig. 3 is an auxiliary shaft 156 spaced from the frame member 56 at the right hand side thereof and substantially in parallelism with the driven shaft 60. The auxiliary shaft 156 is driven by a toothed V-belt 158 which gearingly connects the toothed V-belt pulley 70, on the driven shaft, with a similar V-belt pulley 71 on the auxiliary shaft, so that the driven shaft 60 and the auxiliary shaft 156 rotate together with a fixed angular relationship at a one-to-one speed ratio. In a preferred embodiment of the apparatus, the auxiliary shaft is provided with appropriate means of a type well known in the art for connecting the auxiliary shaft 156 to the film sprockets 31 of the film transport mechanism in the camera 30. Also carried on the auxiliary shaft 156 are a pair of circular commutator discs 91 and 92 of insulating material with each having at least one conductive segment 93 or 94 on its periphery. Radially positioned adjacent each commutator disc 91 or 92 is a brush holder 95 and a carbon brush 97 or 98 of a type well known in the art. The first brush 97 is pressed against the periphery of the first commutator disc 91 and the second brush 98 is similarly pressed against the periphery of the second commutator disc 92 with each being adapted to periodically make electrical contact with the respective conductive segments 93 and 94 so as to complete a circuit therethrough. The conductive segments 93 and 94 of each commutator disc are electrically connected to the auxiliary shaft 156 and the auxiliary shaft is electrically grounded to the frame 54 of the apparatus.

In a preferred embodiment of the apparatus, the large gear 81 on the driving shaft 33 and the first toothed portion 64 of the spool gear 62 each have 20 teeth so as to provide a one-to-one gear ratio for the high speed drive of the camera. The small gear 82 on the driving shaft preferably has 15 teeth and the second toothed portion 66 on the driven shaft 60 has 30 teeth so as to provide a two-to-one gear ratio between the driving shaft 33 and the driven shaft 60 for the low speed drive of the camera.

For clarity in explaining the operation of the speed change mechanism a pair of angular position indicating arrows 160 and 161 are shown as diameters of the driving shaft 33 and the driven shaft 60 in Fig. 3. The phasing arrow 161 of the driven shaft 60 is shown as being radially aligned with the slot 87 in the indexing plate 83. The phasing arrow 160 of the driving shaft 33 is shown as being aligned in parallel with the phasing arrow 161 of the driven shaft.

The operation of the speed change mechanism is as follows: With the large gear 81 of the driving shaft 33 in mesh with the first toothed portion 64 of the driven shaft, the driving shaft 33 and the driven shaft 60 will rotate with the same angular velocities so that the two phasing arrows 160 and 161 will always be parallel. When the shifting handle 152 is rotated clockwise (as seen in Fig. 2) so as to move the spool gear 62 away from the support plate 56, the large driving gear 81 and the first toothed portion 64 of the spool gear 62 will be disengaged. The small driving gear 82 and the second toothed portion 66 of the driven gear will be meshed together before the first toothed portion 64 is entirely unmeshed. That is, the spacing between the first toothed portion 64 and the second toothed portion 66 is such that the first toothed portion 64 cannot be entirely disengaged before the second toothed portion 66 is mechanically meshed with the small driving gear 82. Because of that characteristic, the spool gear 62 may not be axially shifted from its first position to its second position while the motor 32 is energized. Further, the sliding spool gear 62 can be shifted only in the particular angular position shown in Fig. 3 in which the indexing slot 87 is aligned with the indexing pin 85. In all other positions the indexing pin 85 prevents complete axial shifting of the spool gear 62. Thus, it is seen that the indexing plate 83 and the indexing pin 85 operate to permit effective shifting of the spool gear 62 only when the driven shaft 60 and driving shaft 33 are in a predetermined angular phase relation, as shown in Fig. 3.

With the speed change mechanism in the low speed position as shown in Fig. 2, it is clear that the driven shaft 60 will rotate at one half the angular velocity of the driving shaft 33. Thus, the phasing arrows 160 and 161, shown in Fig. 3 will not remain parallel but will return to a parallel position once in every two revolutions of the driving shaft 33. Assuming that the driving shaft 33 is rotated one revolution from the position shown, the phasing arrows 160 and 161 will then be 180 degrees apart. If at that time, the operator attempts to shift the spool gear 62 from the position shown in Fig. 2 to the high speed position, the indexing pin 85 will contact the outer edge of the indexing plate 83 and will prohibit complete shifting of the spool gear 62. However, the shifting handle 152 will have been rotated to a position slightly beyond its overcenter position so that it will not return to the position shown in Fig. 3, when released, but will remain in a position slightly greater than 90 degrees from that shown in Fig. 3. The operator may then push inwardly on the knurled positioning knob 75 and may rotate the driven shaft 60 manually until the slot 87 in the indexing plate 83 is aligned with the indexing pin 85. When such alignment is obtained, the pressure of the shifting fork 89 as biased by the spring member 154 will cause the indexing plate 83 to automatically move past the indexing pin 85. The spool gear 62 is thus shifted from the low speed position to the high speed position without disturbing the mechanical synchronism between the driving shaft 33 and the driven shaft 60. That is, the angular positions of the driving shaft 33 and the driven shaft 60 will be that shown in Fig. 3 at the time when the large driving gear 81 and the first driven gear 64 are meshed together.

From the foregoing, it is seen that it is impossible to shift the spool gear 62 from the position shown in Fig. 2 to the high speed position except when the driving shaft 33 and the driven shaft 60 are in the particular predetermined angular position as shown in Fig. 3. In that angular position the gears may be shifted without upsetting the desired angular relation between the motor shaft 33 and the film transport mechanism.

While the present invention has been shown in one form only, it will be obvious to those skilled in the art that it is not so limited, but is susceptible of various changes and modifications without departing from the spirit and scope thereof. For example, the particular embodiment of the invention described has been shown as having a first gear ratio of one-to-one and a second gear ratio of two-to-one. It will be obvious to those skilled in the art that the apparatus is not limited to those particular ratios but that many other sets of gear ratios may be used while retaining the desired phase relationship between the driving shaft and the driven shaft as the speed change mechanism is shifted from a first speed ratio to a second speed ratio.

We claim as our invention:

1. In an X-ray apparatus including an alternating current voltage source, an electronic contactor for intermittently supplying energy to an X-ray generator and a motion picture camera for photographing an intermittently recurring fluorescent image, the combination of a synchronous motor for driving said camera and controlling the conductivity of said contactor, a speed change mechanism mechanically connected between said motor and said camera and operable to drive said camera alternatively at a first speed and a second speed, said mechanism including an axially shiftable gear, a synchronizing circuit for causing said motor to pull into synchronism in a predetermined angular position relative to said alternating current voltage, and indexing means rigidly connected to said gear to permit axial shifting of said gear at a predetermined angular position only so as to maintain a predetermined phase relation between said motor and film movement in said motion picture camera.

2. In an X-ray fluorographic apparatus including a motion picture camera having a film transport means and further including an X-ray generator and a synchronous motor having a common alternating current voltage source, the combination of a speed-change mechanism connected between said motor and said camera with said mechanism comprising a driving shaft, a driven shaft, a double gear including a large gear and a small gear supported on said driving shaft for rotation therewith, a spool gear including a first toothed portion and a second toothed portion adapted respectively for engagement with said large gear and said small gear and having axially slideable connection to said driven shaft, and an indexing plate connected to said spool gear for rotation therewith, said indexing plate being adapted to permit axial shifting of said spool gear at only one predetermined angular position of said spool gear, whereby said driving shaft and said driven shaft are cyclically positioned in a predetermined angular relation in time coincidence with cyclical energization of said X-ray generator.

3. In a cienfluorographic X-ray apparatus including a motion picture film transport means and an electric motor for driving said film transport means, a speed change mechanism connected to said motor to be driven thereby and operative to drive said film transport means, said mechanism comprising a support frame, a driven shaft supported on said frame for rotation relative thereto, a first gear and a second gear mounted on said driven shaft for rotation therewith, and free to slide lengthwise thereof, a drive shaft supported adjacent said driven shaft, a double gear including a large gear and a small gear fixed to said drive shaft, said large gear being adapted to be meshed with one of said two gears and said small gear being adapted to be meshed with the other of said two gears, shifting means supported by said frame for rendering one or the other of said two gears alternatively effective to drive said driven shaft, and indexing means connected to said first and second gears for rotation therewith, said indexing means being operative to permit effective operation of said shifting means only when said driven shaft is in a predetermined angular position relative to the angular position of said driving shaft.

4. In an X-ray apparatus including a motion picture camera, a synchronous electric motor for driving said camera, and an X-ray generator, the combination of an electronic contactor connected to said generator to intermittently supply alternating current energy thereto, a periodic switch means mechanically connected to said camera for operation in synchronism therewith and electrically connected to control the conductivity of said contactor, and a speed change mechanism connected between said motor and said camera, said mechanism including a driven shaft, a driving shaft, a plurality of gears supported on said shafts and operative to translate rotational motion from said driving shaft to said driven shaft, shifting means supported on said mechanism to shift the position of one of said gears so as to change the relative speeds of said shafts, and indexing means connected to said mechanism and operative to prohibit the shifting of said one of said gears except when said driving shaft and said driven shaft are in a predetermined relative angular position, whereby successive interruptions of film movement in said camera are synchronized so as to occur simultaneously with periodic energizations of said X-ray generator at either of a plurality of preselectable repetition rates.

5. In an X-ray cinefluorographic system having an X-ray generator and a voltage source therefor, and including a film transport mechanism operable at a selectable one of a plurality of speeds wherein the film frame presentation rate is equivalent to a submultiple of the frequency of the X-ray generator voltage source and wherein provision is made for intermittently energizing said X-ray generator in synchronism with successive film frame presentations, a speed change driving mechanism adapted to drive said film transport mechanism at any one of a plurality of speeds and comprising in combination, a synchronous motor, a driving shaft connected to said motor to be driven thereby, a pair of gear wheels including a large gear and a small gear secured to said driving shaft, a driven shaft supported in parallel spaced alignment to said driving shaft, a spool gear splined on said driven shaft to be axially shiftable relative thereto from a first position to a second position and including a first toothed portion and a second toothed portion, with said first and second toothed portions being adapted to mesh respectively and alternatively with said large gear and said small gear to afford respectively a high speed ratio and a low speed ratio, and an indexing member connected to said spool gear for rotation therewith and comprising means for establishing a predetermined angular position at which position said spool gear is axially shiftable from said first position to said second position.

6. X-ray apparatus comprising in combination, an alternating current source of electrical energy; an X-ray generator; X-ray-responsive image-producing means; motion picture camera means operable to intermittently advance successively sections of film to a fixed image-recording position for recording images appearing in said image-producing means; generator-energization control means controlling establishment of periods of X-ray generator energization from said source according to polarity of source voltage; synchronous motor means operating said camera means and controlling operation of said generator-energization control means to correlate camera film advancement with periods of X-ray generation; and motor-synchronizing means controlling source energization of said synchronous motor according to source voltage polarity to correlate establishment of X-ray generation with film advancement such that a period of X-ray generation will begin coincidentally with completion of movement of a respective section of film to said image-recording position.

7. X-ray apparatus comprising in combination, an alternating current source of electrical energy; an X-ray generator; X-ray-responsive image-producing means; motion picture camera means operable to intermittently advance successive sections of film to a fixed image-recording position for recording images appearing in said image-producing means; generator-energization control means controlling establishment of periods of X-ray generator energization from said source according to polarity of source voltage; synchronous motor means operating said camera means and controlling operation of said generator-energization control means to correlate camera film advancement with periods of X-ray generation; motor-synchronizing means controlling source energization of said synchronous motor according to source voltage polarity to correlate establishment of X-ray generation with film advancement such that a period of X-ray generation will begin coincidentally with completion of movement of a respective section of film to said image-recording position; and speed change mechanism permitting change in speed of operation of said camera means by said synchronous motor while assuring the maintenance of the desired correlation between camera film advancement and establishment of X-ray generation.

8. X-ray apparatus comprising in combination, an alternating current source of electrical energy; an X-ray generator; a motion picture camera operable to intermittently advance successive sections of motion picture film to a fixed image-recording position for recording respective images of an object subjected to radiation from said X-ray generator; generator-energization control means operable during the presence of a signal to commence establishment of an energizing circuit from said source to said X-ray generator at a time exclusively near the beginning of a source voltage half-cycle period of particular polarity, and operable upon termination of said signal to disestablish said energizing circuit; switch means controlling the signal to said generator-energization control means; a synchronous motor operatively connected to said motion picture camera and to said switch means to synchronize film advancement relative to X-ray generation such that the film will be advanced in the interval between X-ray pulses and will rest in its image-recording position during presence of X-ray pulses; and motor synchronizing means for assuring that the camera film will come to rest in its image-recording position coincidentally with the beginning of the particular voltage half-cycle period upon which an interval of X-ray generation is commenced by said generator-energization control means.

9. X-ray apparatus comprising in combination, an alternating current source of electrical energy; an X-ray generator; a motion picture camera operable to intermittently advance successive sections of motion picture film to a fixed image-recording position for recording respective images of an object subjected to radiation from said X-ray generator; generator-energization control means operable during the presence of a signal to commence establishment of an energizing circuit from said source to said X-ray generator exclusively at a time near the beginning of a source voltage half-cycle period of particular polarity, and operable upon termination of said signal to disestablish said energizing circuit; switch means controlling the signal to said generator-energization control means; a synchronous motor operatively connected to said motion picture camera and to said switch means to synchronize film advancement relative to X-ray generation such that the film will be advanced in the interval between X-ray pulses and will rest in its image-recording position during presence of X-ray pulses; motor synchronizing means for assuring that the camera film will come to rest in its image-recording position coincidentally with the beginning of the particular voltage half-cycle period upon which an interval of X-ray generation is commenced by said generator-energization control means; and speed change mechanism interposed between said motion picture camera and said synchronous motor to permit change in rate of film advancement while preventing disestablishment of the correlation between film advancement and source voltage polarity.

10. In X-ray apparatus including an alternating current source of electrical energy, an X-ray generator energized for successive periods established according to polarity of said source, motion picture camera means operable to record on successive sections of film X-ray images resultant from respective periods of energization of said X-ray generator, and synchronous motor means having an output shaft operatively connected to said camera means and operated by energy from said alternating current source; the combination therewith of a motor-energizing circuit for conveying energy from said alternating current source to said synchronous motor means, means for sensing the polarity of said alternating current source with respect to the rotary position of the motor shaft, and means controlled by the aforesaid means to control opening and closing of said motor-energizing circuit according to the rotary position of the aforesaid motor shaft relative to the corresponding polarity of said alternating current source.

11. In X-ray apparatus including an alternating current source of electrical energy, an X-ray generator energized for successive periods established according to polarity of said source, motion picture camera means operable to record on successive sections of film X-ray images resultant from respective periods of energization of said X-ray generator, and synchronous motor means having an output shaft operatively connected to said camera means and operated by energy from said alternating current source; the combination therewith of a motor-energizing circuit for conveying energy from said alternating current source to said synchronous motor means, normally-open switch means closeable in said motor-energizing circuit to initiate operation of said synchronous motor means, normally-closed switch means openable in said motor-energizing circuit to deenergize said synchronous motor means while said normally-open switch means is closed, sensing means for opening and closing said normally-closed switch means according to the position of the motor shaft with respect to the corresponding polarity of said alternating current source, and interlock means to prevent opening of said normally-closed switch means following closure of said normally-open switch means until the shaft of said synchronous motor has reached synchronous speed.

12. In X-ray apparatus including an alternating current source of electrical energy, an X-ray generator energized for successive periods established according to polarity of said source, motion picture camera means operable to record on successive sections of film X-ray images resultant from respective periods of energization of said X-ray generator, and synchronous motor means having an output shaft operatively connected to said camera means and operated by energy from said alternating current source; the combination therewith of operator-controlled means for establishing a motor-energizing circuit to convey electrical energy from said alternating current source to said synchronous motor, means for opening and closing said motor energizing circuit according to whether or not a certain relationship exists between the angular position of the rotating synchronous motor shaft and the corresponding polarity of said alternating current source, and means for preventing disestablishment of said motor-energizing circuit until the aforesaid synchronous motor shaft has first been brought up to synchronous speed.

13. In X-ray apparatus including an alternating current source of electrical energy, an X-ray generator energized for successive periods established according to polarity of said source, motion picture camera means operable to record on successive sections of film X-ray images resultant from respective periods of energization of said X-ray generator, and synchronous motor means having an output shaft operatively connected to said camera means and operated by energy from said alternating current source; the combination therewith of means controlling operation of said synchronous motor means to assure that the angular position of its shaft bears a predetermined relationship with respect to the polarity of said alternating current source, and a gear change mechanism interposed between the motor shaft and said camera means to afford a change in relative operational speeds therebetween while preventing disruption of a desired correlation between operation of said camera means and angular position of the aforesaid motor shaft.

References Cited in the file of this patent

UNITED STATES PATENTS

| | | |
|---|---|---|
| 2,331,225 | Powers | Oct. 5, 1943 |
| 2,517,781 | Gacki et al. | Aug. 8, 1950 |
| 2,616,050 | Marshall | Oct. 28, 1952 |
| 2,622,206 | Passannante | Dec. 16, 1952 |
| 2,697,182 | Sheldon | Dec. 14, 1954 |

FOREIGN PATENTS

| | | |
|---|---|---|
| 482,556 | Canada | Apr. 15, 1952 |